United States Patent
Schmid

(10) Patent No.: US 11,855,825 B2
(45) Date of Patent: *Dec. 26, 2023

(54) IBOC COMPATIBLE SUPERPOSITION MODULATION BY INDEPENDENT MODULATORS UTILIZING CLIPPING NOISE FROM PEAK-TO-AVERAGE POWER REDUCTION

(71) Applicant: Nautel Limited, Hackett's Cove (CA)

(72) Inventor: Philipp Schmid, Hackett's Cove (CA)

(73) Assignee: NAUTEL LIMITED, Hackett's Cove (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,132

(22) Filed: Jun. 23, 2022

(65) Prior Publication Data
US 2023/0318898 A1    Oct. 5, 2023

Related U.S. Application Data

(63) Continuation of application No. 17/162,592, filed on Jan. 29, 2021, now Pat. No. 11,381,439.

(30) Foreign Application Priority Data
Jan. 30, 2020    (CA) ................. CA 3070530

(51) Int. Cl.
*H04K 1/02*     (2006.01)
*H04L 25/03*    (2006.01)
*H04L 25/49*    (2006.01)
*H04L 27/26*    (2006.01)
*H04L 27/18*    (2006.01)
(Continued)

(52) U.S. Cl.
CPC ......... *H04L 27/2624* (2013.01); *H04H 40/18* (2013.01); *H04L 5/023* (2013.01); *H04L 27/183* (2013.01); *H04H 2201/18* (2013.01)

(58) Field of Classification Search
CPC ... H04L 27/2624; H04L 5/023; H04L 27/183; H04H 40/18; H04H 2201/18
USPC ........................................... 375/296
See application file for complete search history.

(56) References Cited

U.S. PATENT DOCUMENTS

| 6,128,350 A | 10/2000 | Shastri et al. |
| 2009/0042511 A1 | 2/2009 | Malladi |

(Continued)

FOREIGN PATENT DOCUMENTS

| WO | WO 94/06231 | 3/1994 |

OTHER PUBLICATIONS

Notice of Allowance for U.S. Appl. No. 17/162,592 (dated Mar. 2, 2022).

(Continued)

*Primary Examiner* — Tanmay K Shah
(74) *Attorney, Agent, or Firm* — Jenkins, Taylor & Hunt, P.A.

(57) ABSTRACT

According to an aspect of the present invention, there is provided a method for providing additional bandwidth to receivers that can decode a higher modulation comprising trading a peak-to-average power ratio (PAPR) reduction induced constellation noise of all or a subset of in-band on-channel (IBOC) carriers within an orthogonal frequency division multiplexing (ODFM) waveform with data carrying superposition modulation.

9 Claims, 5 Drawing Sheets

(51) Int. Cl.
*H04H 40/18* (2008.01)
*H04L 5/02* (2006.01)

(56) References Cited

U.S. PATENT DOCUMENTS

2014/0146683 A1  5/2014  Stogner et al.
2017/0208455 A1* 7/2017  Au .......................... H04W 8/22

OTHER PUBLICATIONS

Non-Final Office Action for U.S. Appl. No. 17/162,592 (dated May 27, 2021).
Peyla et al., "New Service Modes for HD RadioTM Transmission," 2018 IEEE Broadcast Symposium (BTS), pp. 1-15 (2018).
"Transmission Signal Quality Metrics for FM IBOC Signals," Ibiquity Digital, HD Radio, SY_TN_2646S, pp. 1-49 (Aug. 24, 2011).
Schmid, "An Improved Method of Peak-to-Average Power Ratio Reduction for FM+IBOC Broadcast Transmission," Dalhousie University, pp. 1-124 (2009).

* cited by examiner

IBOC COMPATIBLE SUPERPOSITION MODULATION BY INDEPENDENT MODULATORS UTILIZING CLIPPING NOISE FROM PEAK-TO-AVERAGE POWER REDUCTION

PRIORITY CLAIM

This application is a continuation of U.S. patent application Ser. No. 17/162,592, filed Jan. 29, 2021, which claims the priority benefit of Canadian Patent Application Serial Number 3070530, filed Jan. 30, 2020, the disclosure of each of which is incorporated herein by reference in its entirety.

BACKGROUND

The In-Band On-Channel (IBOC) standard employed by HD Radio®, as well as other digital broadcast standards like Digital Radio Mondiale (DRM), China Digital Radio (CDR), or Digital Audio Broadcasting (DAB), employ Orthogonal Frequency Division Multiplexing (OFDM) to achieve high data throughput with high spectral efficiency. The addition of a multitude of OFDM carriers produces a signal envelope with high peak-to-average power ratios (PAPR) (Schmid, 2009). Broadcast amplifiers typically must be backed-off in order to accommodate these signal peaks, requiring larger transmitters and reducing efficiency. This problem is well known in the industry and many approaches have been explored to reduce the PAPR of the pure OFDM signal. The approaches taught by (Shelswell, 1992) and (Anjali Shastri, 1999) maintain, control, and limit noise within the signal constellation introduced by clipping the signal peak with it applied to a Quadrature Phase Shift Keyed (QPSK) signal constellation (other constellation types are possible). The aim of these algorithms is typically to improve signal quality by correcting the phase and/or amplitude of the constellation to move all points away from the decision boundary. Many digital transmission standards impose limitations on the Modulation Error Ratio (MER) in order to guarantee a minimum acceptable signal quality emitted from the broadcast transmitter. The National Radio Systems Committee (NRSC) defined such a specification for IBOC signal quality in (National Radio Systems Committee (NRSC), 2011).

SUMMARY OF THE INVENTION

The invention has a number of aspects that may be exploited individually or in combination.

According to an aspect of the present invention, there is provided a method for providing additional bandwidth to receivers that can decode a higher modulation comprising trading a peak-to-average power ratio (PAPR) reduction induced constellation noise of all or a subset of in-band on-channel (IBOC) carriers within an orthogonal frequency division multiplexing (ODFM) waveform with data carrying superposition modulation.

In one embodiment, the IBOC carrier is Quadrature Phase Shift Keyed (QPSK) modulated.

In another embodiment, the superposition modulation is hierarchical modulation.

BRIEF DESCRIPTION OF THE DRAWINGS

These and other features of the invention will become more apparent from the following description in which reference is made to the appended drawings wherein.

DETAILED DESCRIPTION

Throughout the following description, specific details are set forth in order to provide a more thorough understanding of the invention. However, the invention may be practiced without these particulars. In other instances, well known elements may not have been shown or described in detail to avoid unnecessarily obscuring the disclosure. Accordingly, the description and drawings are to be regarded as illustrative, rather than restrictive. Immaterial modifications may be made to the embodiments described herein without departing from what is covered by the claims.

Figure 1:
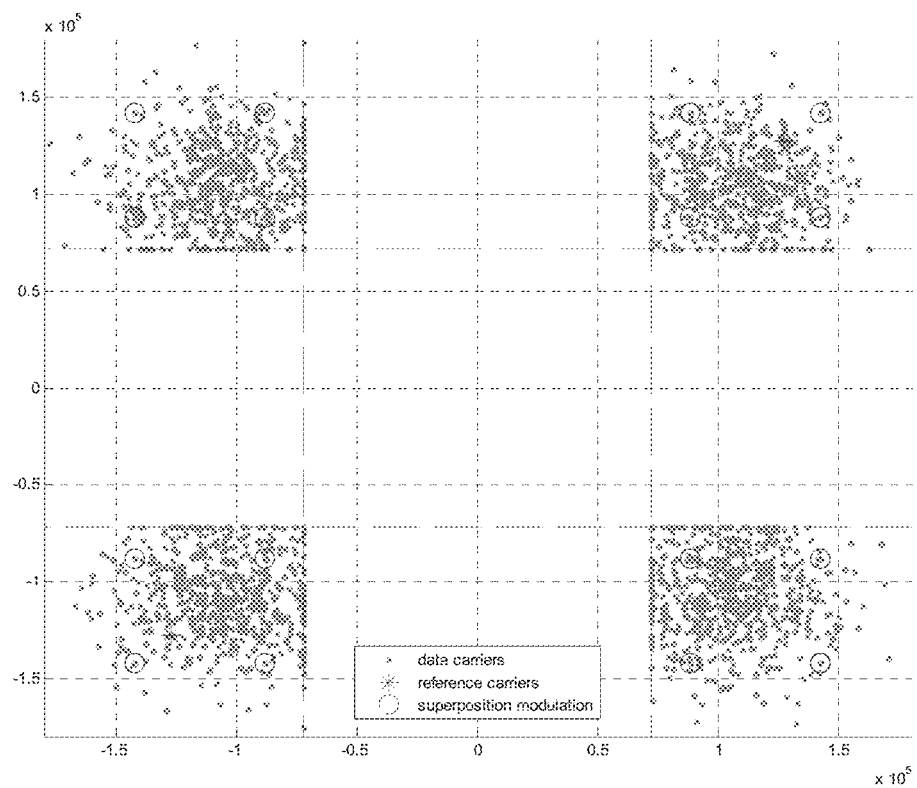
FIG. 1 is a graphical representation of IBOC signal constellation with PAPR reduction induced clipping noise and superpositioned QPSK modulation for a subset of IBOC carriers. All IBOC carriers exhibit roughly 14 dB MER that is within IBOC quality specifications.

The method described herein involves trading the peak-to-average power ratios (PAPR) reduction induced constellation noise of all or a subset of the In-Band On-Channel (IBOC) carriers (Quadrature Phase Shift Keyed (QPSK) modulated or other) within the Orthogonal Frequency Division Multiplexing (OFDM) waveform with data carrying superposition modulation, also known as hierarchical modulation, providing additional bandwidth to receivers that can decode the higher order modulation. Shown in FIG. 1 as red circles. Standard receivers will ignore the added modulation and consider it no different than other constellation noise and will not be negatively affected, provided the added modulation can also comply with the required signal quality specification. Existing broadcast transmitters already utilize this portion of the spectrum/constellation for PAPR reduction while complying with all established signal quality standards and specifications. These standards do not specify the intended purpose of the constellation noise; therefore, it can be repurposed for superposition modulation. As such, no special ruling should be required by a spectrum regulator, such as the Federal Communications Commission (FCC). A broadcaster can unlock this spectrum asset without causing undue interference nor harm to their own main signal transmission.

Methods to provide super positioned modulation are well-known in the industry. The method described herein is to integrate this type of modulation within the PAPR reduction algorithm in such a way as to provide a flexible trade-off between data capacity and PAPR affecting transmitter power performance, while complying with established signal quality specifications.

Figure 2:
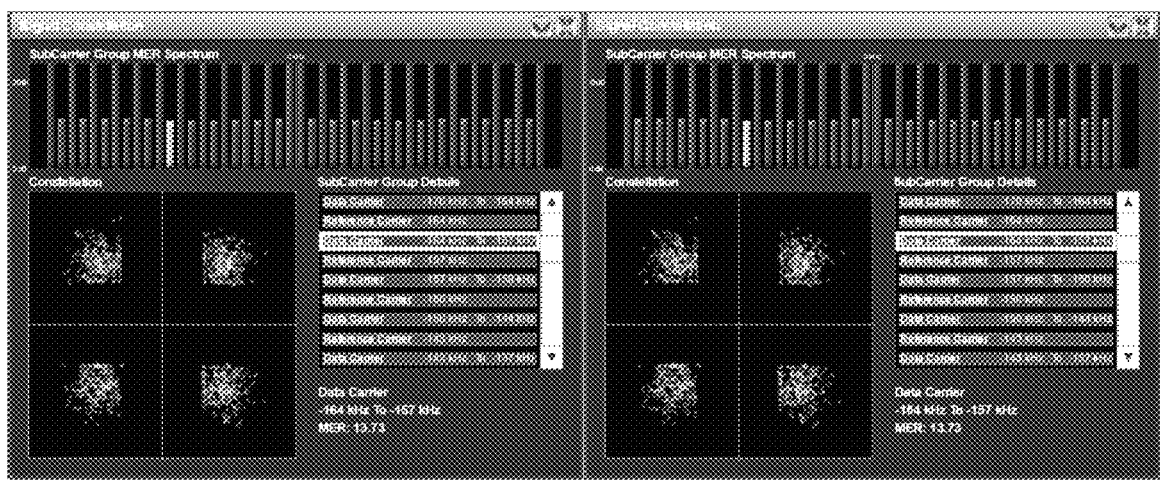
FIG. 2 shows superposition modulation of 5 outer most IBOC partitions (left) with PAR reduction noise on remaining partitions (right), reference carriers are unaffected.

FIG. 2 shows the demodulated IBOC signal constellation of two sidebands composed of 11 frequency partitions (MP2 mode) per sideband, of which the outer 5 ones are allocated to superposition modulation (QPSK in this example) and the inner 6 are allocated to normal IBOC modulation including PAPR reduction noise. Many other combinations are possible ranging from all partitions being used for superposition modulation to singular partitions to individual carriers in any combination. Reference carriers could be used but are not typically employed in order to ensure best possible signal tracking and channel equalization by the receiver. A digital receiver that is capable of decoding both the primary and secondary modulation can utilize the same symbol tracking, equalization and other signal conditioning for both sets of modulation. If the secondary modulation is only on a single sideband, the receiver only needs to decode that particular sideband leading to receiver cost improvements as a lower bandwidth front end would be required. Information about the secondary modulation (carrier location, etc. . . . ) can be conveyed via data services on the primary modulation or vice versa.

Figure 3:
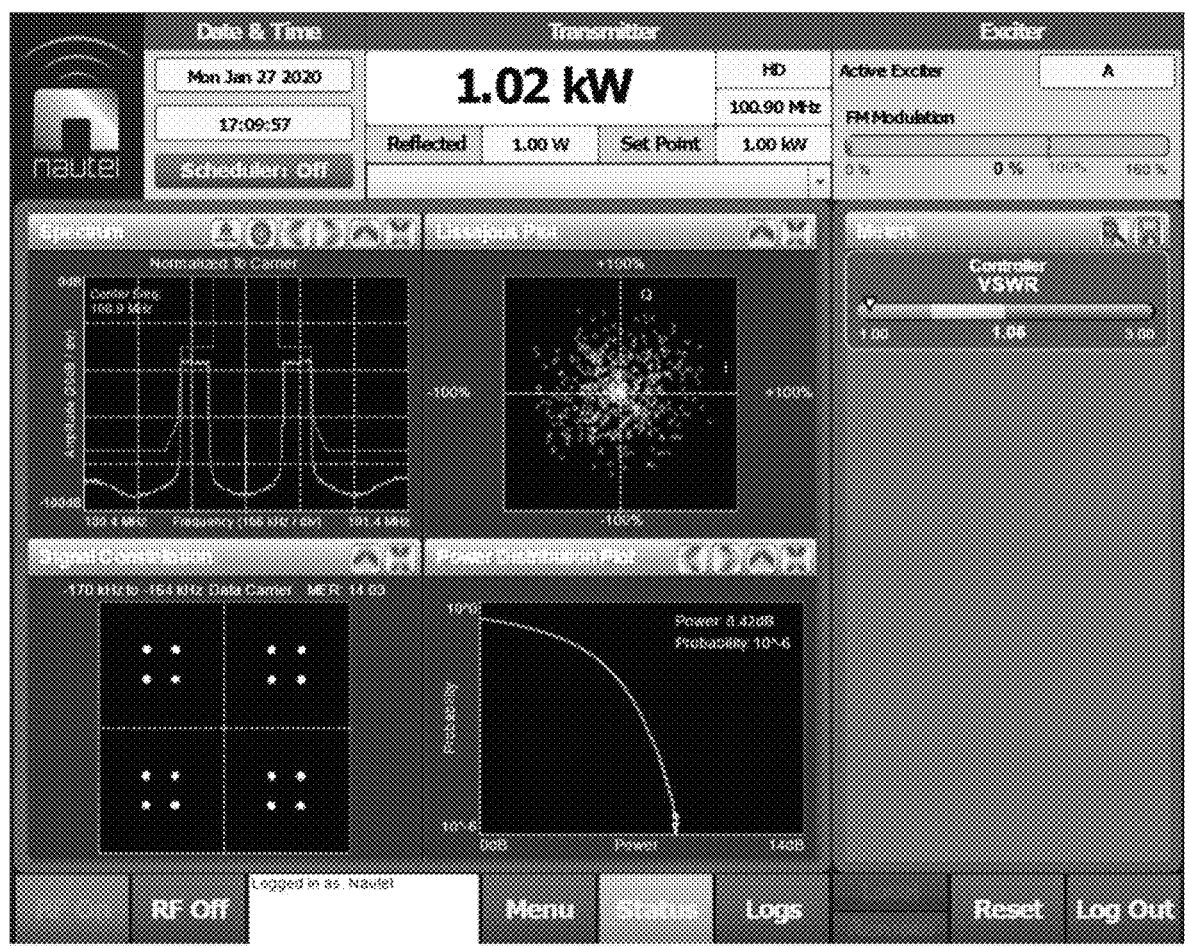
FIG. 3 shows IBOC with superpositioned QPSK modulation on a running transmitter with increased PAPR.

The broadcaster has flexibility in how much of the signal to dedicate to superposition modulation and how much to dedicate to PAPR reduction. The higher the data capacity, the higher the PAPR requiring a larger transmitter to broadcast the super positioned modulation. In FIG. 3, a broadcast transmitter transmitting the described signal is operating at reduced power levels due to the increased PAPR. In order to superimpose a $2^{nd}$ constellation, the first constellation must be moved back to a clean reference point thus reducing the degrees of freedom the PAPR reduction can take, increasing the remaining signal peaks over the number of iterations of the reduction algorithm. Note that while clean super positioned constellations are shown, it may be feasible to maintain a small degree of clipping noise within that constellation or use other methods, such as swapping constellation points, to help with peak reduction. However, due to the small constellation distance of the 2nd super positioned modulation, little margin exists for such a scheme, rendering them less effective while maintaining information bearing constellations. While FIG. 3 displays IBOC only carriers, it is understood that this concept also applies to hybrid FM+IBOC signal configurations using hybrid crest factor reduction (Schmid, 2009) or other IBOC or digital radio signal configurations.

Figure 4:
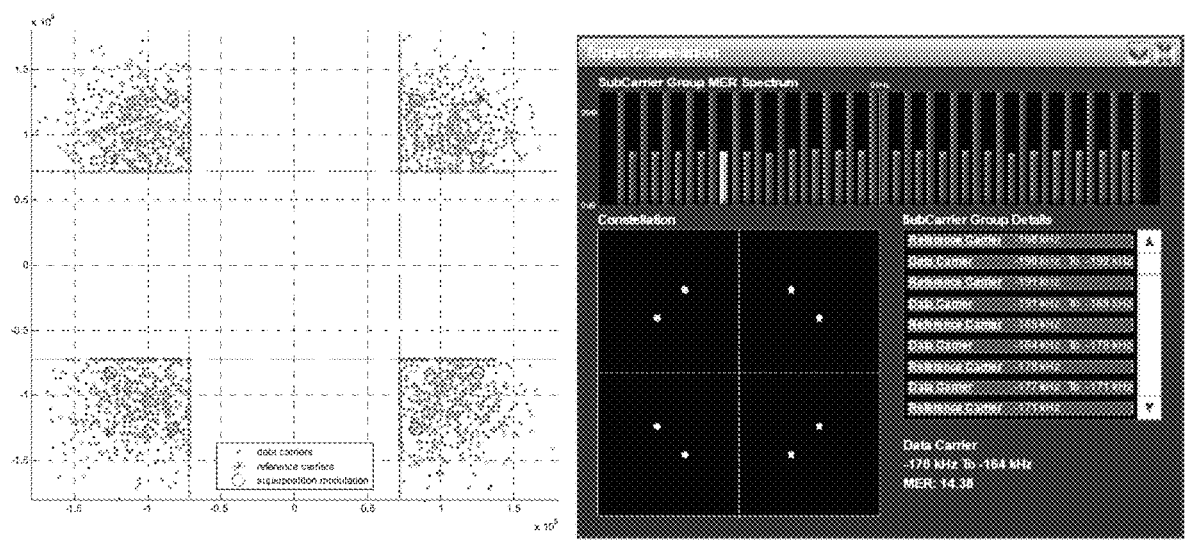
FIG. 4 shows binary phase shift keying (BSPK) super positioned on IBOC carriers.

The QPSK super positioned modulation method described herein has the advantage that the $2^{nd}$ modulator does not need to know the constellation of the primary modulation. The secondary modulation can be a simple addition to the primary modulation that can be performed either in the frequency or time domain. Other modulation or constellation methods can be applied to this method. FIG. 4 shows a method based on binary phase shift keying (BPSK) which does require knowledge of the primary modulation for optimal superposition. Data is assigned to one of two constellation points within the first quadrant of the primary constellation. The resultant frequency domain constellation point can be rotated by 90, 180, or 270 degrees based on the primary modulation. The benefit of this method is a greater constellation power leading to a more robust secondary modulation. Secondary constellation points are adjusted to yield the same power spectral density as normal carriers without secondary modulation. However, it is possible to assign differing power levels to these carriers, but this may violate the primary modulation signal quality specifications. It may also be possible to include the primary modulated bit stream in the secondary modulation process to augment data capacity or forward error correction.

Without wishing to be bound by theory, the method described herein can provide 50% more data capacity for BPSK or double the broadcast system's data capacity for QPSK. However, the method can further comprise a complete communications system design, including forward error correction (FEC) and other aspects that affect the overall data throughput. It is expected that because of the reduced constellation power, which is constrained by the quality specifications (14 dB MER for IBOC, 21 dB MER for FM-DRM), more robust FEC is required for a reasonable communications link budget to achieve reasonable coverage, reducing the data capacity.

Figure 5:
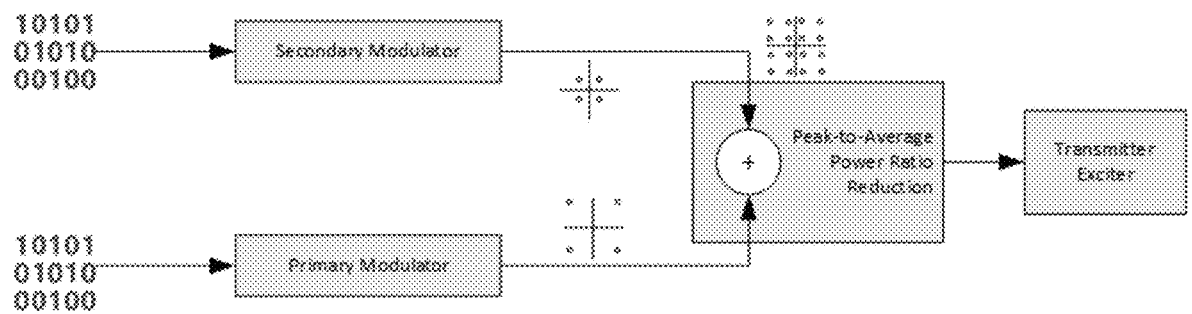
FIG. 5 shows dual independent modulators for super position modulation.

An added advantage of this method is that the secondary modulation can be added using a second modulator that is independent from the primary modulator, as shown in FIG. 5. The two signals are combined within the PAPR reduction component of the overall system, which has knowledge of how both modulators are configured. A key benefit of this approach is that the two modulators can be isolated or air-gapped from a network security point of view. Neither modulator can affect the logical bit stream of the other. This is very important in security sensitive applications, such as the electric power grid.

A potential application is to convey power grid information, such as current power rates, to many internet of things (IoT) devices. While the primary modulation may be a typical digital radio broadcast, with heavy media integration obtaining content from many sources on the Internet that cannot be guaranteed to be at the same security level as required by the power grid. The secondary modulation can be composed entirely independently and can be configured to comply with various security requirements; it can be considered air-gapped.

While this method has been described with reference to the IBOC signal used in HD Radio® because of the backward compatibility to the many existing receives in the field, the method is equally applicable to many other digital modulation standards.

While a number of exemplary aspects and embodiments have been discussed above, those with skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

REFERENCES

Anjali Shastri, Brian William Kroeger. 1999. Method and apparatus for reducing peak to average power ratio in digital broadcasting systems. U.S. Pat. No. 6,128,350 Aug. 24, 1999.

National Radio Systems Committee (NRSC). 2011. Transmission Signal Quality for IBOC Signals. 2011. 2646s.

Schmid, Philipp. 2009. An Improved Method of Peak-to-Average Power Ratio Reduction for FM+IBOC Broadcast Transmission. Halifax: s.n., 2009.

Shelswell, Peter. 1992. Digital Signal Transmission System Using Frequency Division Multiplex. WO 94/06231 Great Britain, Sep. 7, 1992. British Broadcasting Corporation.

The invention claimed is:

1. A radio transmission method comprising: transmitting an orthogonal frequency division multiplexing (OFDM) waveform signal to a plurality of receivers; the modulated signal for providing additional bandwidth to receivers capable of decoding a higher modulation while a main modulation of the OFDM waveform signal complies with signal quality specifications to be compatible with receivers capable of receiving the same, the transmitted OFDM waveform signal trading a peak-to-average power ratio (PAPR) reduction induced constellation noise of all or a subset of in-band on-channel (IBOC) carriers within the ODFM waveform with data carrying hierarchical modulation.

2. The method of claim 1, wherein the IBOC carrier is Quadrature Phase Shift Keyed (QPSK) modulated.

3. The method of claim 1, wherein a secondary modulation is added using an independent second modulator.

4. The method of claim 3, wherein the secondary modulation is for security requirements.

5. The method of claim 1, where peak-to-average power ratio (PAPR) reduction algorithm takes into account the hierarchical modulation.

6. The method of claim 5, where the PAPR reduction algorithm can be flexibly configured to dedicate some carriers to hierarchical modulation and others to main modulation PAPR reduction.

7. The method of claim 6, where the main modulation conveys to a receiver which carriers are allocated to hierarchical modulation and which are allocated to main modulation.

8. The method of claim 1, wherein a secondary modulation is added using an independent second modulator and the outputs of the modulators is summed within the same spectrum or channel allocation.

9. The method of claim 8, wherein the secondary modulation can satisfy more stringent security requirements by not being affected by the main modulation.

\* \* \* \* \*